(12) United States Patent
Kumagai et al.

(10) Patent No.: US 10,185,026 B2
(45) Date of Patent: Jan. 22, 2019

(54) MEASURING INSTRUMENT

(71) Applicant: TOPCON Corporation, Tokyo-to (JP)

(72) Inventors: Kaoru Kumagai, Tokyo-to (JP); Fumio Ohtomo, Saitama (JP)

(73) Assignee: TOPCON Corporation, Tokyo-to (JP)

( * ) Notice: Subject to any disclaimer, the term of this patent is extended or adjusted under 35 U.S.C. 154(b) by 0 days.

(21) Appl. No.: 15/373,773

(22) Filed: Dec. 9, 2016

(65) Prior Publication Data

US 2017/0168142 A1    Jun. 15, 2017

(30) Foreign Application Priority Data

Dec. 10, 2015  (JP) .................. 2015-240825

(51) Int. Cl.
| | |
|---|---|
| *G01S 7/481* | (2006.01) |
| *G01S 17/02* | (2006.01) |
| *G02B 5/04* | (2006.01) |
| *H04N 5/225* | (2006.01) |
| *G01C 15/00* | (2006.01) |

(Continued)

(52) U.S. Cl.
CPC .......... *G01S 7/4812* (2013.01); *G01C 15/002* (2013.01); *G01S 7/4813* (2013.01); *G01S 7/4817* (2013.01); *G01S 17/023* (2013.01); *G01S 17/42* (2013.01); *G01S 17/66* (2013.01); *G01S 17/89* (2013.01); *G02B 5/04* (2013.01);

(Continued)

(58) Field of Classification Search
None
See application file for complete search history.

(56) References Cited

U.S. PATENT DOCUMENTS

2016/0274224 A1* 9/2016 Nordenfelt .......... G01C 15/002

FOREIGN PATENT DOCUMENTS

| EP | 1574821 A2 | 9/2005 |
|---|---|---|
| EP | 3056856 A1 | 8/2016 |

(Continued)

OTHER PUBLICATIONS

European communication dated May 2, 2017 in corresponding European patent application No. 16202457.4.

(Continued)

*Primary Examiner* — Heather R Jones
(74) *Attorney, Agent, or Firm* — Nields, Lemack & Frame, LLC (57) ABSTRACT

The invention provides a measuring instrument, which comprises a light emitting element, a distance measuring light projecting unit, a light receiving unit, a distance measuring unit for performing a distance measurement, a first optical axis deflecting unit for deflecting an optical axis of a distance measuring light, a second optical axis deflecting unit for deflecting a reflected distance measuring light, a projecting direction detecting unit for detecting a deflection angle and a deflecting direction, and a control unit, wherein the distance measuring light is projected through the first optical axis deflecting unit, the reflected distance measuring light is received by a light receiving element through the second optical axis deflecting unit, and the control unit acquires three-dimensional data of a measuring point based on a result of the distance measurement of the distance measuring unit and on a detection result of the projecting direction detecting unit.

13 Claims, 9 Drawing Sheets (51) Int. Cl.
  *G01S 17/42* (2006.01)
  *G01S 17/66* (2006.01)
  *G01S 17/89* (2006.01)
(52) U.S. Cl.
  CPC .......... *H04N 5/2257* (2013.01); *G01S 7/4811* (2013.01)

(56) References Cited

FOREIGN PATENT DOCUMENTS

| EP | 3056857 A1 | 8/2016 | |
|---|---|---|---|
| WO | 2004/099849 A1 | 11/2004 | |
| WO | WO 2004099849 A1 * | 11/2004 | ........... G01S 7/4817 |
| WO | 2015/082217 A2 | 6/2015 | |

OTHER PUBLICATIONS

European communication dated Jun. 15, 2018 in corresponding European patent application No. 16202457.4.

* cited by examiner

MEASURING INSTRUMENT

BACKGROUND OF THE INVENTION

The present invention relates to a measuring instrument, by which data of an object to be measured can be acquired in a simple manner.

As a measuring instrument for measuring three-dimensional coordinates of an object to be measured, a total station is known, for instance. As a conventional total station, a total station has been known, which has a motor for sighting automatically, and is designed so as to sight the object to be measured automatically and to be capable of performing a measurement after being installed at a measuring position.

However, in a case of the conventional total station, a sighting is performed by one-point sighting. Therefore, in order to measure the objects to be measured of two or more positions, it has been necessary to sight the object to be measured by changing a sighting position every time for each measurement and to repeat the measurement. Further, since it is necessary to change the sighting position for each one point, much time has been required for the measurement even in a case where an area of the measurement was narrow.

SUMMARY OF THE INVENTION

It is an object of the present invention to provide a measuring instrument, by which a measurement time is shortened.

To attain the object of the invention as described above, a measuring instrument according to the present invention comprises a light emitting element for emitting a distance measuring light, a distance measuring light projecting unit for projecting the distance measuring light, a light receiving unit for receiving a reflected distance measuring light, a light receiving element for receiving the reflected distance measuring light and for producing a light receiving signal, a distance measuring unit for performing a distance measurement based on the light receiving signal from the light receiving element, a first optical axis deflecting unit disposed on a projection optical axis of the distance measuring light and for deflecting an optical axis of the distance measuring light at a deflection angle as required and in a direction as required, a second optical axis deflecting unit disposed on a light receiving optical axis and for deflecting the reflected distance measuring light at the same deflection angle and in the same direction as the first optical axis deflecting unit, a projecting direction detecting unit for detecting a deflection angle and a deflecting direction as performed by the first optical axis deflecting unit, a control unit for controlling the distance measurement by the distance measuring unit and for controlling deflections of optical axes of the distance measuring light and the reflected distance measuring light, and a measuring instrument main body adapted to accommodate the light emitting element, the distance measuring light projecting unit, the light receiving unit, the light receiving element, the distance measuring unit, the first optical axis deflecting unit, the second optical axis deflecting unit, the projecting direction detecting unit, and the control unit, to be rotatably supported in an up-and-down direction and in a left-and-right direction by a supporting unit, and to be rotated in the up-and-down direction and in the left-and-right direction by a rotation driving unit, wherein the distance measuring light is projected through the first optical axis deflecting unit, the reflected distance measuring light is received by the light receiving element through the second optical axis deflecting unit, and the control unit acquires three-dimensional data of a measuring point based on a result of the distance measurement of the distance measuring unit and on a detection result of the projecting direction detecting unit.

Further, in the measuring instrument according to the present invention, the distance measuring light projecting unit has a projection optical axis deflecting unit for coinciding the projection optical axis with the light receiving optical axis, the first optical axis deflecting unit is provided at a central part of the second optical axis deflecting unit, and the distance measuring light is deflected by the projection optical axis deflecting unit and is projected through the first optical axis deflecting unit.

Further, in the measuring instrument according to the present invention, the supporting unit has a detection unit for detecting a rotation angle in the up-and-down direction and a rotation angle in the left-and-right direction of the measuring instrument main body, and the control unit controls a driving of the rotation driving unit so as to perform the distance measurement of the measuring point out of a deflection area of the first optical axis deflecting unit based on a detection result of the detection unit.

Further, in the measuring instrument according to the present invention, the first optical axis deflecting unit and the second optical axis deflecting unit comprise a pair of circular optical prisms overlapped on each other, and each of the optical prisms is independently rotatable.

Further, in the measuring instrument according to the present invention, the second optical axis deflecting unit is a Fresnel prism.

Further, the measuring instrument according to the present invention further comprises an image pickup unit having an image pickup optical axis running in parallel to and having a known relation with the optical axis of the distance measuring light, and wherein the deflection area of the distance measuring light deflected by the first optical axis deflecting unit and a field angle of the image pickup unit are adapted to coincide or approximately coincide with each other.

Further, the measuring instrument according to the present invention further comprises a tracking light projecting unit for projecting a tracking light, a tracking light receiving unit for receiving a reflected tracking light, a tracking light receiving element for receiving the tracking light and for producing the light receiving signal, and a tracking unit for tracking an object to be measured based on the light receiving signal from the tracking light receiving element.

Furthermore, in the measuring instrument according to the present invention, the first optical axis deflecting unit and the second optical axis deflecting unit are unitized and are designed to be attachable and detachable from each other.

According to the present invention, the measuring instrument comprises a light emitting element for emitting a distance measuring light, a distance measuring light projecting unit for projecting the distance measuring light, a light receiving unit for receiving a reflected distance measuring light, a light receiving element for receiving the reflected distance measuring light and for producing a light receiving signal, a distance measuring unit for performing a distance measurement based on the light receiving signal from the light receiving element, a first optical axis deflecting unit disposed on a projection optical axis of the distance measuring light and for deflecting an optical axis of the distance measuring light at a deflection angle as required and in a direction as required, a second optical axis deflecting unit disposed on a light receiving optical axis and for deflecting the reflected distance measuring light at the same deflection angle and in the same direction as the first optical axis deflecting unit, a projecting direction detecting unit for detecting a deflection angle and a deflecting direction as performed by the first optical axis deflecting unit, a control unit for controlling the distance measurement by the distance measuring unit and for controlling deflections of optical axes of the distance measuring light and the reflected distance measuring light, and a measuring instrument main body adapted to accommodate the light emitting element, the distance measuring light projecting unit, the light receiving unit, the light receiving element, the distance measuring unit, the first optical axis deflecting unit, the second optical axis deflecting unit, the projecting direction detecting unit, and the control unit, to be rotatably supported in an up-and-down direction and in a left-and-right direction by a supporting unit, and to be rotated in the up-and-down direction and in the left-and-right direction by a rotation driving unit, wherein the distance measuring light is projected through the first optical axis deflecting unit, the reflected distance measuring light is received by the light receiving element through the second optical axis deflecting unit, and the control unit acquires three-dimensional data of a measuring point based on a result of the distance measurement of the distance measuring unit and on a detection result of the projecting direction detecting unit. As a result, there is no need to drive a driving motor, and it is possible to shorten the measurement time and to acquire the three-dimensional data of an arbitrary position by a simple arrangement.

DETAILED DESCRIPTION OF THE PREFERRED EMBODIMENT

A description will be given on an embodiment of the present invention by referring to the attached drawings.

First, referring to FIG. 1 and FIG. 2, a description will be given on a measuring instrument 1 according to a first embodiment.

The measuring instrument 1 is a total station, for instance, and is installed on a horizontal plane, for instance. The measuring instrument 1 has a measuring instrument main body 2, a frame unit 3, and a base unit 4.

The frame unit 3 is designed in a recessed form having a recessed portion, and the measuring instrument main body 2 is accommodated in the recessed portion. The measuring instrument main body 2 is supported on the frame unit 3 via an up-and-down rotation shaft 5, and is designed as rotatable in an up-and-down direction around the up-and-down rotation shaft 5 as a center.

At an end portion of the up-and-down rotation shaft 5, an up-and-down driven gear 6 is fitted. The up-and-down driven gear 6 meshes with an up-and-down driving gear 7, and the up-and-down driving gear 7 is fixed on an output shaft of an up-and-down driving motor 8. The measuring instrument main body 2 is so arranged to be rotated in the up-and-down direction by the up-and-down driving motor 8.

Further, between the up-and-down rotation shaft 5 and the measuring instrument main body 2, an up-and-down rotation angle detector 9 (e.g. an encoder) for detecting an up-and-down angle (an angle in a rotating direction around the up-and-down rotation shaft 5 as the center) is provided. By the up-and-down rotation angle detector 9, it is so arranged that a relative rotation angle in the up-and-down direction of the measuring instrument main body 2 with respect to the frame unit 3 is detected.

From a lower surface of the frame unit 3, a left-and-right rotation shaft 11 is protruded. The left-and-right rotation shaft 11 is rotatably fitted to the base unit 4 via a bearing (not shown). The frame unit 3 is so arranged to be rotatable in a left-and-right direction around the left-and-right rotation shaft 11 as the center.

A left-and-right driven gear 12 is fixed on the frame unit 4 concentrically with the left-and-right rotation shaft 11. A left-and-right driving motor 14 is provided on the frame unit 3, and a left-and-right driving gear 13 is fixed on an output shaft of the left-and-right driving motor 14. The left-and-right driving gear 13 meshes with the left-and-right driven gear 12. The frame unit 3 is so arranged to be rotated in the left-and-right direction by the left-and-right driving motor 14.

Further, between the left-and-right rotation shaft 11 and the base unit 4, a left-and-right rotation angle detector 15 (e.g. the encoder) for detecting a left-and-right angle (the angle in the rotating direction around the left-and-right rotation shaft 11 as the center) is provided. By the left-and-right rotation angle detector 15, it is so arranged that the relative rotation angle in the left-and-right direction of the frame unit 3 with respect to the base unit 4 is detected.

By cooperating the up-and-down driving motor 8 and the left-and-right driving motor 14 with each other, the measuring instrument main body 2 can be directed in a direction as desired. In a case where the measuring instrument 1 is installed on a plane which is not horizontal, a leveling mechanism may be provided additionally so as to level the measuring instrument 1 horizontally. It is to be noted that the frame unit 3 and the base unit 4 make up a supporting unit of the measuring instrument main body 2. Further, the up-and-down driving motor 8 and the left-and right driving motor 14 make up a rotation driving unit of the measuring instrument main body 2.

In the measuring instrument main body 2, a distance measuring light projecting unit 16, a light receiving unit 17, a distance measuring unit 18, an image pickup unit 19, a projecting direction detecting unit 21, a motor driver 22, an arithmetic processing unit 23, an operation unit 24, and a display unit 25 are accommodated and are integrated together. It is to be noted that the display unit 25 may be designed as a touch panel and may be also served as the operation unit 24.

The distance measuring light projecting unit 16 has a projection optical axis 26, and a light emitting element 27, e.g. a laser diode (LD), is provided on the projection optical axis 26. Further, a projecting lens 28 is provided on the projection optical axis 26. Further, by a first reflection mirror 29 as an optical deflecting component provided on the projection optical axis 26 and a second reflection mirror 32 as the optical deflecting component provided on a light receiving optical axis 31 (to be described later), the projection optical axis 26 is deflected so as to coincide with the light receiving optical axis 31. It is to be noted that the first reflection mirror 29 and the second reflection mirror 32 make up a projection optical axis deflecting unit.

Next, a description will be given on the light receiving unit 17. A reflected distance measuring light from an object to be measured enters the light receiving unit 17. The light receiving unit 17 has the light receiving optical axis 31, and the projection optical axis 26 deflected by the first reflection mirror 29 and the second reflection mirror 32 coincides with the light receiving optical axis 31.

On the light receiving optical axis 31, a light receiving element 33, for instance, a photodiode (PD), is provided, and further an image forming lens 34 is disposed. The image forming lens 34 forms an image of the reflected distance measuring light on the light receiving element 33. The light receiving element 33 receives the reflected distance measuring light and produces a light receiving signal. The light receiving signal is inputted to the distance measuring unit 18.

Further, on the light receiving optical axis 31 (i.e. the projection optical axis 26) and on an objective side of the image forming lens 34, an optical axis deflecting unit 35 is disposed. A description will be given below on the optical axis deflecting unit 35 by referring to FIG. 3.

Figure 3:
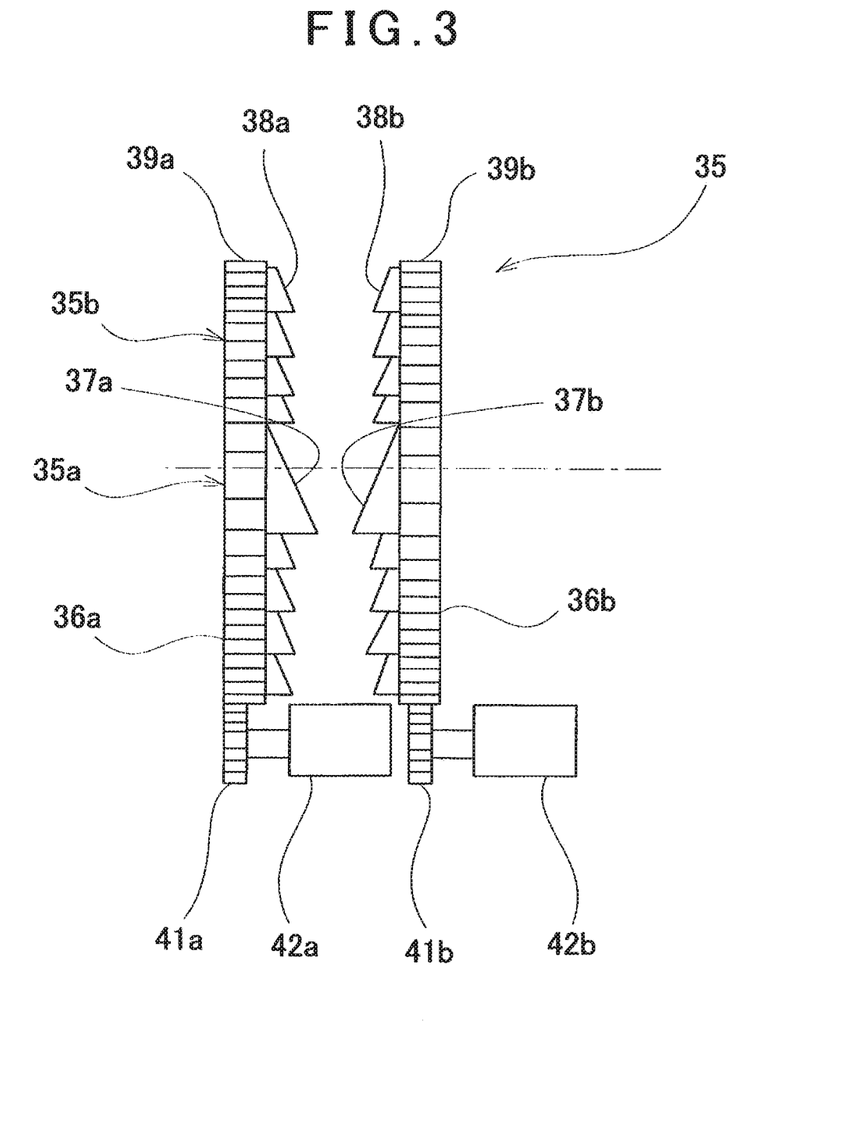
FIG. 3 is an enlarged view of an optical axis deflecting unit of the optical system.

The optical axis deflecting unit 35 comprises a pair of optical prisms 36a and 36b. Each of the optical prisms 36a and 36b is designed in a disk-like shape, disposed perpendicularly crossing to each other on the light receiving optical axis 31, overlapped on each other, and arranged in parallel to each other. As for the optical prisms 36a and 36b, a Fresnel prism is preferably used respectively in order to reduce a size of an instrument.

A central part of the optical axis deflecting unit 35 is designed as a distance measuring optical axis deflecting unit 35a, which is a first optical axis deflecting unit where a distance measuring light passes. A part except the central part is designed as a reflected distance measuring optical axis deflecting unit 35b, which is a second optical axis deflecting unit where the reflected distance measuring light passes.

The Fresnel prism used as the optical prisms 36a and 36b is composed of prism elements 37a and 37b and a large number of prism elements 38a and 38b formed in parallel to each other respectively and has a plate-like shape. The optical prisms 36a and 36b as well as each of the prism elements 37a and 37b and the prism elements 38a and 38b have the same optical characteristics.

The prism elements 37a and 37b make up the distance measuring optical axis deflecting unit 35a. The prism elements 38a and 38b make up the reflected distance measuring optical axis deflecting unit 35b.

The Fresnel prism may be manufactured by an optical glass but may be molded by an optical plastic material. By molding the Fresnel prism by the optical plastic material, a low cost Fresnel prism can be manufactured.

Each of the optical prisms 36a and 36b is arranged in such a manner that each of the optical prisms 36a and 36b rotates independently and individually with the light receiving optical axis 31 as the center respectively. By independently controlling rotating directions, rotation amounts and rotating speeds, the optical prisms 36a and 36b deflect the projection optical axis 26 of the distance measuring light as emitted in an arbitrary direction, and deflect the light receiving optical axis 31 of the reflected distance measuring light as received in parallel to the projection optical axis 26.

Outer shapes of the optical prisms 36a and 36b are arranged in a disk-like shape with the light receiving optical axis 31 as the center, respectively. Further, taking an expansion of the reflected distance measuring light into consideration, diameters of the optical prisms 36a and 36b are set so that a sufficient light amount can be obtained.

A ring gear 39a is fitted with an outer periphery of the optical prism 36a, and a ring gear 39b is fitted with an outer periphery of the optical prism 36b.

A driving gear 41a meshes with the ring gear 39a, and the driving gear 41a is fixed to an output shaft of a motor 42a. Similarly, a driving gear 41b meshes with the ring gear 39b, and the driving gear 41b is fixed to an output shaft of a motor 42b. The motors 42a and 42b are electrically connected to the motor driver 22.

As each of the motors 42a and 42b, a motor capable of detecting a rotation angle or a motor which rotates corresponding to a driving input value, for instance, a pulse motor is used. Alternatively, a rotation amount of the motor may be detected by using a rotation angle detector for detecting a rotation amount (rotation angle) of the motor, such as an encoder, for instance, or the like. The rotation amounts of the motors 42a and 42b are detected by the encoder, or the like, and the motors 42a and 42b are individually controlled by the motor driver 22.

The driving gears 41a and 41b and the motors 42a and 42b are provided at positions not interfering with the distance measuring light projecting unit 16, for instance, on a lower side of the ring gears 39a and 39b.

It is to be noted that the projecting lens 28, the distance measuring optical axis deflecting unit 35a, or the like, make up a projecting optical system. Further, the reflected distance measuring optical axis deflecting unit 35b, the image forming lens 34, or the like, make up a light receiving optical system.

The distance measuring unit 18 controls the light emitting element 27 and emits a laser beam as the distance measuring light. By the prism elements 37a and 37b (the distance measuring optical axis deflecting unit 35a), the projection optical axis 26 is deflected so that the distance measuring light is directed to a measuring point.

The reflected distance measuring light as reflected from the object to be measured enters via the prism elements 38a and 38b (the reflected distance measuring optical axis deflecting unit 35b) and the image forming lens 34 and is received by the light receiving element 33. The light receiving element 33 sends the light receiving signal to the distance measuring unit 18. The distance measuring unit 18 performs a distance measurement of the measuring point (a point where the distance measuring light is projected) based on the light receiving signal from the light receiving element 33.

The image pickup unit 19 is a camera having a field angle of 50°, for instance, and acquires image data including the object to be measured. The image pickup unit 19 has an image pickup optical axis 43 extending in a horizontal direction when the measuring instrument main body 2 is in a horizontal attitude, and the image pickup optical axis 43 and the projection optical axis 26 are set so as to run in parallel to each other. Further, a distance between the image pickup optical axis 43 and the projection optical axis 26 is set a known value.

An image pickup element 44 of the image pickup unit 19 is a CCD or a CMOS sensor which is an aggregate of pixels, and it is so arranged that a position of each pixel on an image element can be specified. For instance, the position of each pixel is specified by a coordinate system with the image pickup optical axis 43 as an origin point.

The projecting direction detecting unit 21 counts driving pulses input to the motors 42a and 42b and detects the rotation angles of the motors 42a and 42b. Alternatively, the projecting direction detecting unit 21 detects the rotation angles of the motors 42a and 42b based on signals from the encoders. Further, the projecting direction detecting unit 21 calculates rotation positions of the optical prisms 36a and 36b based on the rotation angles of the motor 42a and 42b. Further, the projecting direction detecting unit 21 calculates a deflection angle and a projecting direction of the distance measuring light based on refractive indexes and the rotation positions of the optical prisms 36a and 36b. Calculation results are inputted to the arithmetic processing unit 23.

The arithmetic processing unit 23 is a control unit and is configured by an input/output control unit, an arithmetic unit (CPU), a storage unit, or the like. The storage unit stores programs such a distance measuring program for controlling a distance measuring operation, a control program for controlling drivings of the motors 42a and 42b by the motor driver 22, a control program for controlling drivings of the up-and-down driving motor 8 and the left-and-right driving motor 14, a directional angle calculating program for calculating directional angles (a horizontal angle and a vertical angle) of the projection optical axis 26 based on a calculation result in the projecting direction from the projecting direction detecting unit 21 and detection results of the up-and-down rotation angle detector 9 and the left-and-right rotation angle detector 15, an image display program for displaying the image data, distance measurement data, etc. on the display unit 25, or the like. Further, in the storage unit, measurement results such as distance measurement data, the image data, or the like, are stored.

Figure 4A:
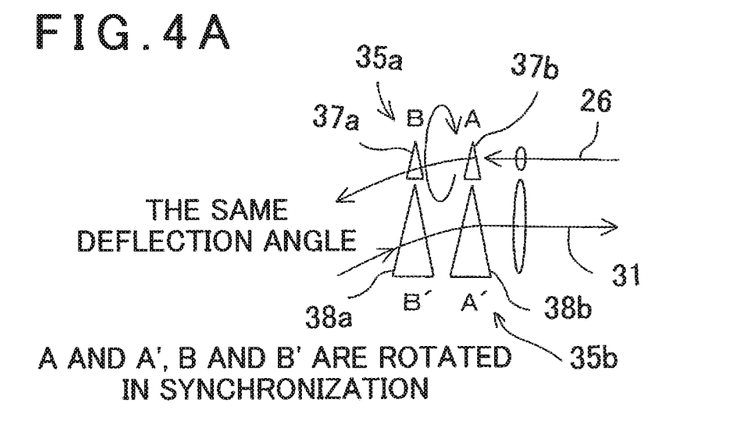
FIG. 4A, FIG. 4B and FIG. 4C are explanatory drawings to show operations of the optical axis deflecting unit.

Next, a description will be given on a measurement operation by the measuring instrument 1 by referring to FIG. 4A and FIG. 4B. It is to be noted that to simplify the explanation, in FIG. 4A, the optical prisms 36a and 36b are shown by separating the prism elements 37a and 37b and the prism elements 38a and 38b. Further, the prism elements 37a and 37b and the prism elements 38a and 38b as shown in FIG. 4A are in a state in which the maximum deflection angle can be obtained. Further, the minimal deflection angle is a position where either one of the optical prisms 36a or 36b is rotated by 180°. The deflection angle of this moment becomes 0°, and an optical axis of the laser beam as projected becomes parallel to the projection optical axis 26. The prism elements 38a and 38b are set in such a manner that the object to be measured and a measurement target area can be scanned by the distance measuring light within a range of ±20°.

The distance measuring light is emitted from the light emitting element 27, and the distance measuring light is turned to a parallel luminous flux by the projecting lens 28 and is projected toward the object to be measured or the measurement target area through the distance measuring optical axis deflecting unit 35a (the prism elements 37a and 37b). Here, by passing through the distance measuring optical axis deflecting unit 35a, the distance measuring light is deflected to a direction as required and projected by the prism elements 37a and 37b.

The reflected distance measuring light as reflected by the object to be measured or by the measurement target area is incident through the reflected distance measuring optical axis deflecting unit 35b (the prism elements 38a and 38b) and is focused on the light receiving element 33 by the image forming lens 34.

Since the reflected distance measuring light passes through the reflected distance measuring optical axis deflecting unit 35b, an optical axis of the reflected distance measuring light is deflected by the prism elements 38a and 38b so as to coincide with the light receiving optical axis 31 (FIG. 4A).

By a combination of the rotation positions of the optical prism 36a and the optical prism 36b, a deflecting direction and a deflecting angle of the distance measuring light to be projected can be arbitrarily changed.

Further, under a condition where a positional relation between the optical prism 36a and the optical prism 36b is fixed (under a condition where the deflection angles obtained by the optical prism 36a and the optical prism 36b are fixed), the optical prism 36a and the optical prism 36b are integrally rotated by the motors 42a and 42b. A locus drawn by the distance measuring light of this moment passing through the distance measuring optical axis deflecting unit 35a becomes a circle with the projection optical axis 26 as the center.

Therefore, by rotating the optical axis deflecting unit 35 while emitting the laser beam from the light emitting element 27, the distance measuring light can be scanned by the locus of the circle.

It is to be noted that it is needless to say that the reflected distance measuring optical axis deflecting unit 35b is integrally rotated with the distance measuring optical axis deflecting unit 35a.

Figure 4B:
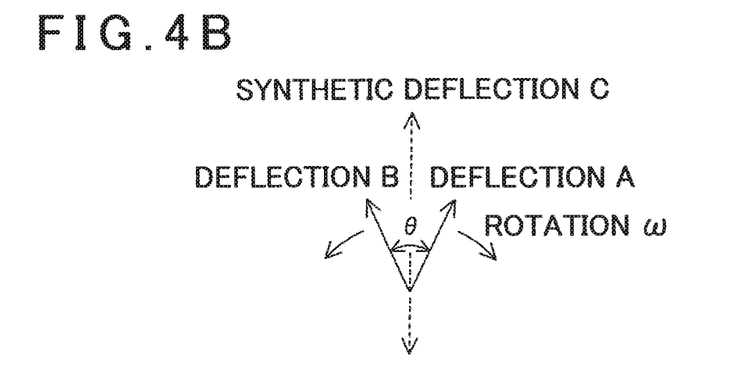

Next, FIG. 4B illustrates a case where the optical prism 36a and the optical prism 36b are relatively rotated. It is supposed that a deflecting direction of the optical axis as deflected by the optical prism 36a is a deflection "A", and the deflecting direction of the optical axis as deflected by the optical prism 36b is a deflection "B". The deflection of this moment of the optical axis by the optical prisms 36a and 36b becomes a synthetic deflection "C" as an angle difference θ between the optical prisms 36a and 36b.

Therefore, each time the angle difference θ is changed, by rotating the optical axis deflecting unit 35 once, the distance measuring light can be scanned linearly.

Figure 4C:
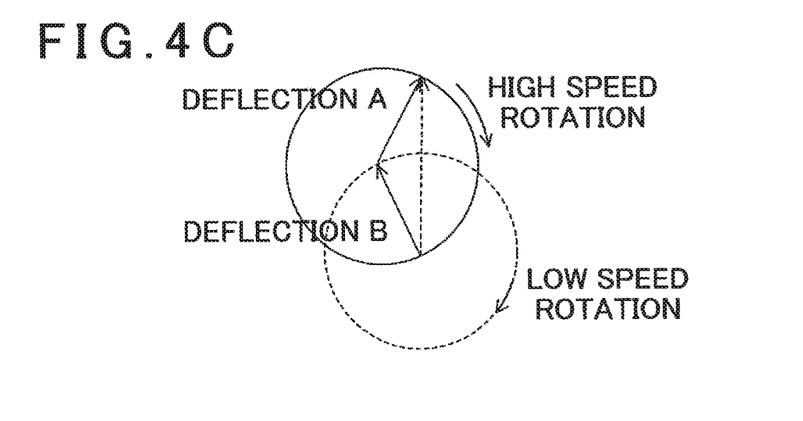

Further, as illustrated in FIG. 4C, when the optical prism 36b is rotated at a rotating speed lower than the rotating speed of the optical prism 36a, since the distance measuring light is rotated while the angle difference θ is gradually increased, the scanning locus of the distance measuring light becomes a spiral form.

Furthermore, by individually controlling the rotating direction and the rotating speed of the optical prism 36a and the optical prism 36b, the scanning locus of the distance measuring light is made in a radial direction (scanning in the radial direction) with the projection optical axis 26 as the center or in a horizontal direction or in a vertical direction or the like, and various scanning states can be obtained.

As a mode of measurement, by performing the distance measurement by fixing the optical axis deflecting unit 35 per each deflection angle as required, the distance measurement can be performed with respect to a specific measuring point. Further, by executing the distance measurement while changing the deflection angles of the optical axis deflecting unit 35, that is, by executing the distance measurement while scanning the distance measuring light, distance measurement data with respect to the measuring point on the scanning locus can be acquired.

Further, a projection directional angle of each distance measuring light can be detected by the rotation angle of the motors 42*a* and 42*b* and the detection results of the up-and-down rotation angle detector 9 and the left-and-right rotation angle detector 15. By associating the projection directional angle and the distance measurement data, three-dimensional distance measurement data can be acquired.

As described above, the measuring instrument 1 comprises the image pickup unit 19, and an image acquired by the image pickup unit 19 is displayed on the display unit 25.

Here, since the field angle of the image pickup unit 19 is 50°, for instance, and a scanning range by the optical prisms 36*a* and 36*b* is ±20°, for instance, a measurement area of the distance measuring unit 18 approximately coincides with an image pickup area of the image pickup unit 19. Therefore, the measuring operator can easily specify the measurement area by visual sensation. Further, since the measuring operator can find the object to be measured or select the object to be measured from the image displayed on the display unit 25, there is no need to sight the object to be measured.

The field angle of the image pickup unit 19 and the scanning range by the optical prisms 36*a* and 36*b* are not limited to the field angle and the scanning range as described above. For instance, it may be arranged in such a manner that the measurement area of the distance measuring unit 18 and the measurement area of the image pickup unit 19 are completely coincided with each other.

When the object to be measured is selected, the optical prisms 36*a* and 36*b* are rotated so that the distance measuring light is deflected toward the object to be measured. It is to be noted that in a case where the object to be measured is out of the image pickup area of the image pickup unit 19, the up-and-down driving motor 8 and the left-and-right driving motor 14 are driven so that the object to be measured is positioned within the image pickup area of the image pickup unit 19.

The projection optical axis 26 and the image pickup optical axis 43 are parallel to each other, and both the optical axes are in a known relation. Therefore, the arithmetic processing unit 23 can match an image center with the projection optical axis 26 on the image acquired by the image pickup unit 19. Further, the arithmetic processing unit 23 can specify the measuring point on the image based on a projection angle by detecting the projection angle of the distance measuring light. Therefore, it is possible to easily associate the three-dimensional data of the measuring point with the image acquired by the image pickup unit 19, and the image acquired by the image pickup unit 19 can be turned to an image with the three-dimensional data.

Figure 5A:
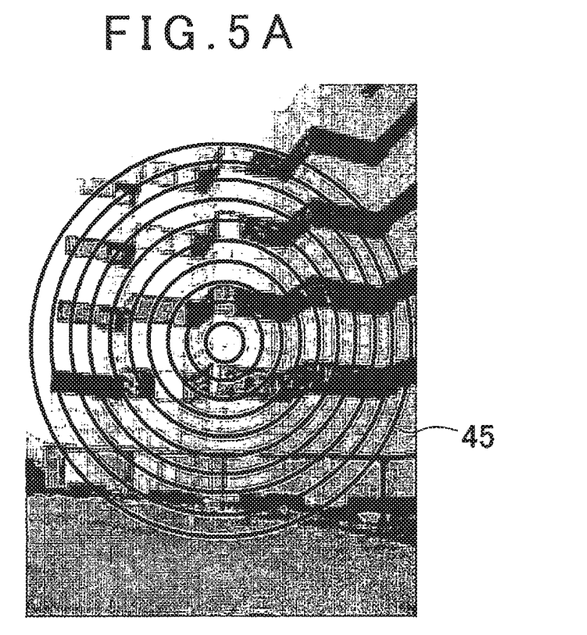
FIG. 5A and FIG. 5B are explanatory drawings to show a relation between an acquired image and a scanning locus.
Figure 5B:
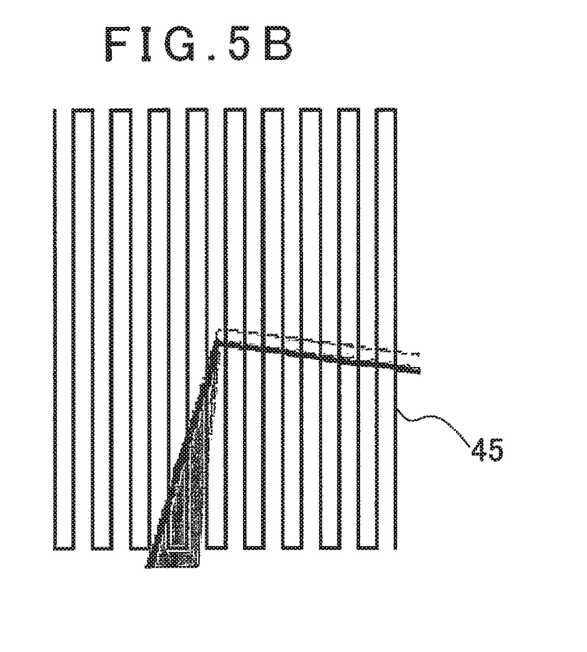

FIG. 5A and FIG. 5B show a relation between the image acquired by the image pickup unit 19 and a locus obtained on the measuring point. It is to be noted that FIG. 5A shows a case where the distance measuring light is scanned in a concentric and multi-circular form. FIG. 5B shows a case where the distance measuring light is reciprocally scanned linearly. In the figure, reference numeral 45 denotes a scanning locus and the measuring points are positioned on the scanning locus 45.

Further, in a case where the measurement of a wide area is executed, images at two or more points may be prepared by driving the up-and-down driving motor 8 and the left-and-right motor 14, and a plurality of images may be synthesized. Further, a wide-angle camera capable of acquiring an image with wider angle than the measurement area of the distance measuring unit 18 may be provided additionally and the images acquired by the image pickup unit 19 may be fitted into a wide-angle image acquired by the wide-angle camera like a patchwork. By the method as described above, it is possible to execute the measurement without a waste or without leaving an unmeasured portion.

It is to be noted that in the above description, although the distance measuring optical axis deflecting unit 35*a* and the reflected distance measuring optical axis deflecting unit 35*b* are formed on the same optical prism and integrated together, the projection optical axis 26 and the light receiving optical axis 31 may be separated from each other. In this case, the distance measuring optical axis deflecting unit 35*a* and the reflected distance measuring optical axis deflecting unit 35*b* are provided individually on the projection optical axis 26 and the light receiving optical axis 31, and it may be so arranged that the distance measuring optical axis deflecting unit 35*a* and the reflected distance measuring optical axis deflecting unit 35*b* are synchronously rotated.

Further, although the above description has been given on a case where the object to be measured as designated on the image acquired by the image pickup unit 19 is measured, that is, on a case where one point is measured, the measuring instrument 1 can also acquire point cloud data of the measurement area. In a case where the point cloud data is acquired, an acquiring interval between data in the point cloud data is set via the operation unit 24. For instance, by setting the scanning locus 45 as shown in FIG. 5A and FIG. 5B, the distance measuring light is deflected along the scanning locus 45 by the optical prisms 36*a* and 36*b*, and three-dimensional point cloud data can be acquired along the scanning locus 45.

As described above, in the first embodiment, since it is possible to deflect the projection optical axis 26 to an arbitrary position by rotations of the optical prisms 36*a* and 36*b*, the measuring point can be changed without driving the up-and-down driving motor 8 and the left-and-right driving motor 14 and without rotating the measuring instrument main body 2 with heavy-mass and the frame unit 3 with heavy-mass. Therefore, it is possible to change the measuring point at high speed, to shorten the measurement time, and to acquire three-dimensional data at the arbitrary position by a simple arrangement.

Further, since it is arranged in such a manner that the measurement of the object to be measured is performed by designating the object to be measured from the image as acquired by the image pickup unit 19, there is no need to sight the object to be measured, a setting of a measuring position can be performed at high speed, and the measurement time can be shortened.

Further, since the measurement area of the distance measuring unit 18 is coincided or approximately coincided with the image pickup area of the image pickup unit 19, there is no need to drive the up-and-down driving motor 8 and the left-and-right driving motor 14 in order to deflect the projection optical axis 26 to the object to be measured on the image. Therefore, since it would suffice that the optical prisms 36*a* and 36*b* are rotated, the measurement can be performed promptly, and the measurement time can be shortened.

Further, even in a case where two or more objects to be measured exist in a narrow area, that is, in a case where the two or more objects to be measured exist in the image, it would suffice that two or more objects to be measured are designated on the image. As a result, there is no need to change a sighting position for each object to be measured, and the measurement time can be extensively shortened.

Further, since the distance measuring light can be scanned on the predetermined scanning locus 45 by rotating the optical prisms 36*a* and 36*b*, the point cloud data on the scanning locus 45 can be acquired. Therefore, it is possible to acquire the point cloud data without using a laser scanner and to acquire the point cloud data in a simple manner and at a low cost.

Figure 6:
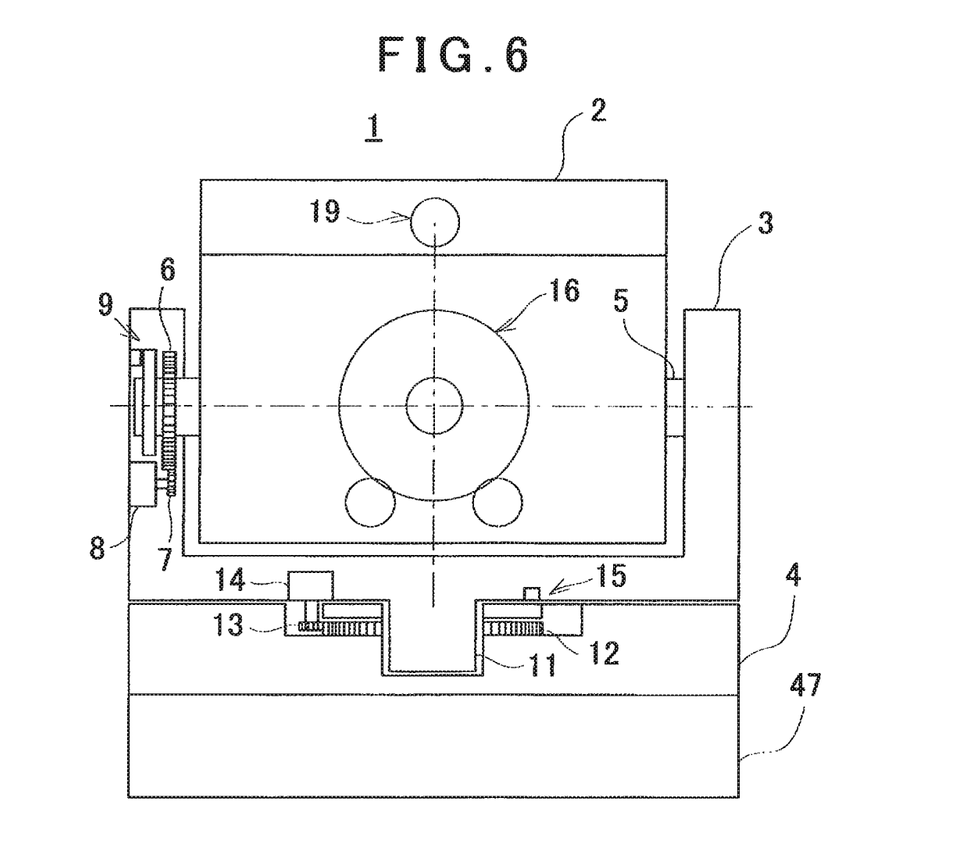
FIG. 6 is a front view to show the measuring instrument according to a second embodiment of the present invention.
Figure 7:
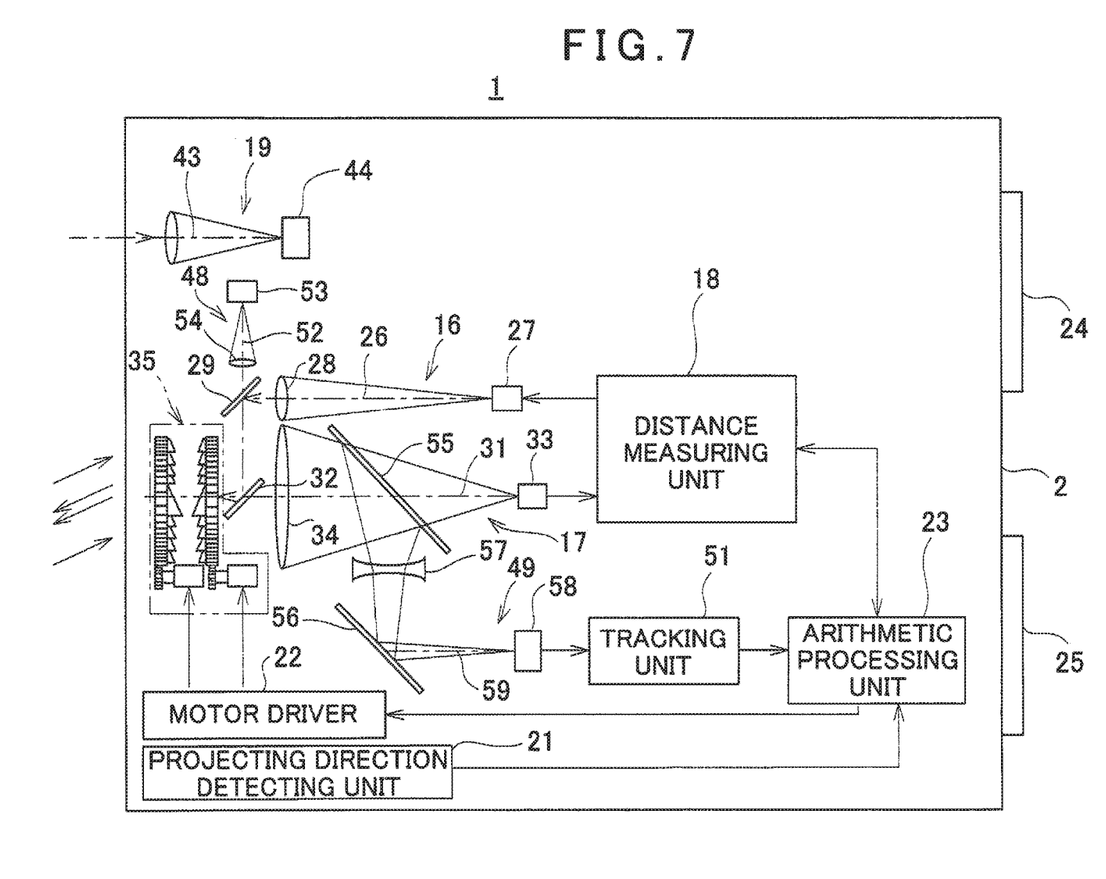
FIG. 7 is a schematical drawing to show the optical system of the measuring instrument according to the second embodiment of the present invention.
Figure 8:
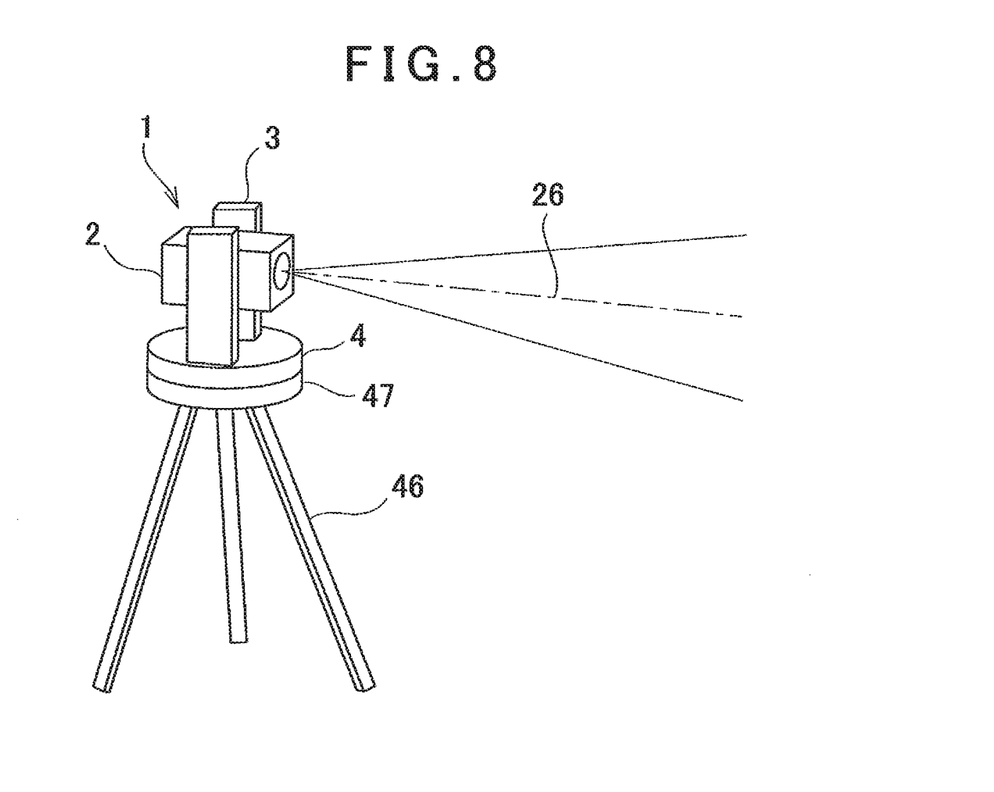
FIG. 8 is a perspective view to show the measuring instrument according to the second embodiment of the present invention.

Next, referring to FIG. 6 to FIG. 8, a description will be given on a second embodiment. In FIG. 6 to FIG. 8, what are equivalent to components as shown in FIG. 1 and FIG. 2 are referred by the same symbol, and detailed description thereof will not be given here.

A measuring instrument 1 in the second embodiment is a total station having a tracking function, for instance, and is installed on a tripod 46.

The measuring instrument 1 has a surveying base plate 47, on which a base unit 4 is provided. The surveying base plate 47 has an automatic leveling mechanism and has a function to perform an automatic leveling of the measuring instrument 1 provided on the tripod 46. Further, a tracking light projecting unit 48, a tracking light receiving unit 49, and a tracking unit 51 are accommodated in a measuring instrument main body 2.

The tracking light projecting unit 48 has a tracking optical axis 52, and a light emitting element 53, e.g. a laser diode (LD), for emitting a tracking light having a different wavelength from the wavelength of a distance measuring light is provided on the tracking optical axis 52. Further, a projecting lens 54 is provided on the tracking optical axis 52. Further, a first reflection mirror 29 as an optical deflecting component is provided on the tracking optical axis 52.

The first reflection mirror 29 has a wavelength selecting function and is a beam splitter having optical characteristics to reflect the distance measuring light and to allow the tracking light to pass, for instance. The tracking light passing through the first reflection mirror 29 coincides with a projection optical axis 26 as reflected by the first reflection mirror 29. Further, the tracking light coincides with a light receiving optical axis 31 by being reflected by a second reflection mirror 32 as the optical deflecting component.

Next, a description will be given on the tracking light receiving unit 49. The tracking light receiving unit 49 has a third reflection mirror 55, which is the optical deflecting component and has the wavelength selecting function, a condenser lens 57, a fourth reflection mirror 56, which is the optical deflection component, and a tracking light receiving element 58.

The third reflection mirror 55 is provided on the light receiving optical axis 31 and has optical characteristics to reflect a reflected tracking light and to allow a reflected distance measuring light with a different wavelength to pass. Further, the tracking light receiving unit 49 has a tracking light receiving optical axis 59, and the fourth reflection mirror 56 and the tracking light receiving element 58 are provided on the tracking light receiving optical axis 59. Further, the condenser lens 57 is disposed between the third reflection mirror 55 and the fourth reflection mirror 56.

In a case where a tracking is performed, a prism with a retroreflectivity is used as an object to be measured. The reflected tracking light as reflected by a prism (not shown) is reflected by the third reflection mirror 55, is converged by the condenser lens 57, is deflected onto the tracking light receiving optical axis 59 by the fourth reflection mirror 56, and is received by the tracking light receiving element 58. The tracking light receiving element 58 is a CCD or a CMOS sensor which is an aggregate of pixels, and it is so arranged that a position of each pixel on an image element can be specified. The tracking light receiving element 58 receives the reflected tracking light and produces a light receiving signal based on a light receiving position on the tracking light receiving element 58. The light receiving signal is inputted to the tracking unit 51.

The tracking unit 51 detects a position of the prism based on the light receiving position of the reflected tracking light on the tracking light receiving element 58 and calculates a difference between a center of the tracking light receiving element 58 and the position of the prism. A calculation result is inputted to an arithmetic processing unit 23.

The arithmetic processing unit 23 controls drivings of an up-and-down driving motor 8, a left-and-right driving motor 14, and motors 42*a* and 42*b* based on the calculation results at the tracking unit 51. Further, the arithmetic processing unit 23 rotates optical prisms 36*a* and 36*b* and rotates the measuring instrument main body 2 in an up-and-down direction and a left-and-right direction so that the reflected tracking light from the prism is received at the center of the tracking light receiving element 58.

In the second embodiment, the prism is tracked by cooperating the tracking by a rotation of the optical prisms 36*a* and 36*b* with higher response speed and the rotation of the measuring instrument main body 2 capable of corresponding to a large movement of the object to be measured. As a result, the tracking in a wide area can be performed promptly, and a measurement time can be shortened.

Further, since the tracking light is projected coaxially with the distance measuring light, it is possible to miniaturize an optical system and to miniaturize the measuring instrument 1.

It is to be noted that in the first embodiment and the second embodiment, it may be arranged in such a manner that the optical axis deflecting unit 35 (the optical prisms 36*a* and 36*b*), the motors 42*a* and 42*b*, or the like as shown in FIG. 3 are unitized and are attachable and detachable from the optical system. By unitizing the optical axis deflecting unit 35 and the motors 42*a* and 42*b*, a unit can also be applied to a measuring instrument such as an already existing type total station, or the like. Therefore, it is possible to shorten the measurement time in an already existing type measuring instrument and to acquire the point cloud data at a lower cost.

Figure 9:
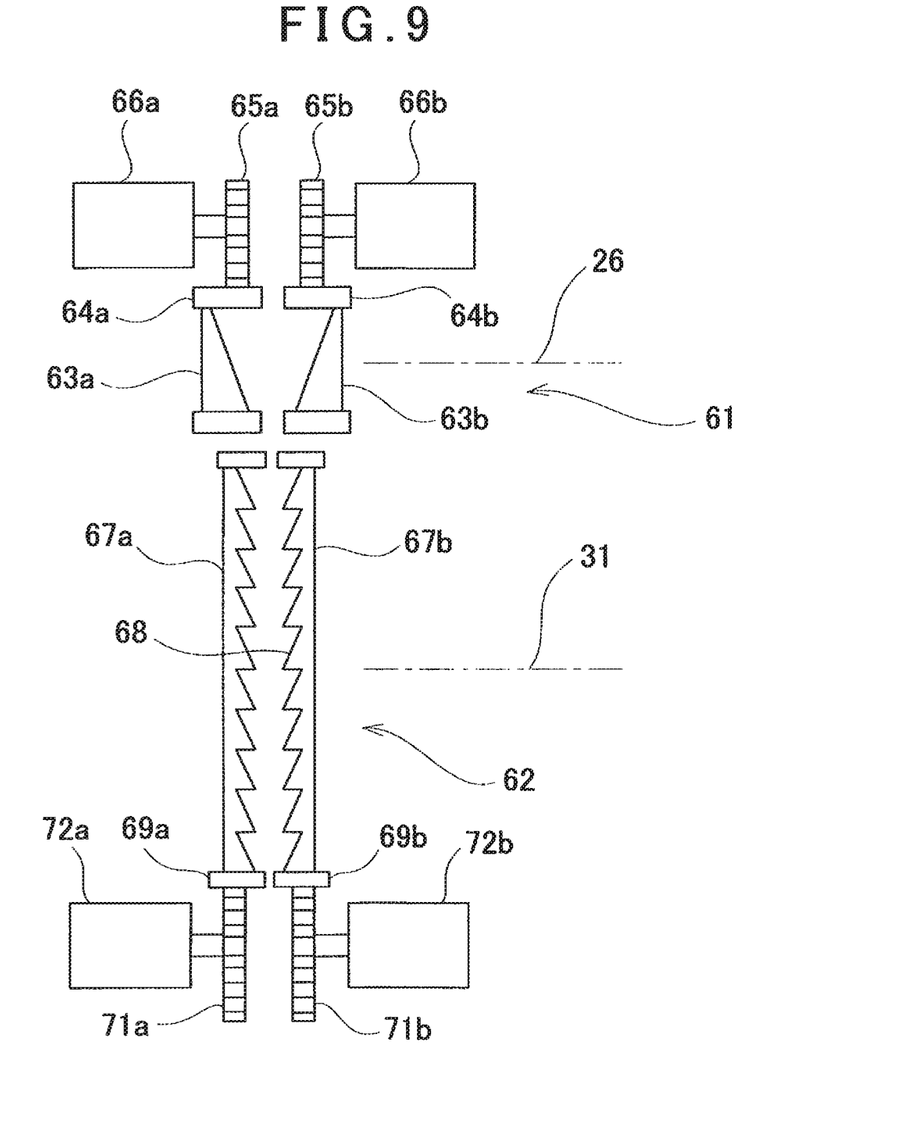
FIG. 9 is an enlarged view of the optical axis deflecting unit of the optical system to show a variation example of the first embodiment and the second embodiment of the present invention.

FIG. 9 shows a variation example of the first embodiment and the second embodiment.

In the variation example, an optical axis deflecting unit 35 in the first embodiment and the second embodiment is divided into a first optical axis deflecting unit 61 and a second optical axis deflecting unit 62. It is to be noted that in FIG. 9, what are equivalent to components as shown in FIG. 2 and FIG. 7 are referred by the same symbol.

On a projection optical axis 26, the first optical axis deflecting unit 61 is provided, and the first optical axis deflecting unit 61 comprises two first optical prisms 63*a* and 63*b*. Each of the first optical prisms 63*a* and 63*b* can be independently and individually rotated with the projection optical axis 26 as a center. By individually controlling the rotating directions, rotation amounts, and rotating speeds of the first optical prisms 63*a* and 63*b*, an optical axis of a distance measuring light is deflected in an arbitrary direction.

Outer shapes of the first optical prisms 63*a* and 63*b* are arranged in a disk-like shape with the projection optical axis 26 as the center. A first ring gear 64a is fitted with an outer periphery of the first optical prism 63a, and a first ring gear 64b is fitted with an outer periphery of the first optical prism 63b.

A first driving gear 65a meshes with the first ring gear 64a, and the first driving gear 65a is fixed to an output shaft of a first motor 66a. Further, a first driving gear 65b meshes with the first ring gear 64b, and the first driving gear 65b is fixed to an output shaft of a first motor 66b.

As each of the first motors 66a and 66b, a motor capable of detecting a rotation angle or a motor which rotates corresponding to a driving input value, for instance, a pulse motor is used. Alternatively, a rotation amount of the motor may be detected by using a rotation angle detector for detecting a rotation amount (rotation angle) of the motor, such as an encoder, for instance, or the like.

It is to be noted that in FIG. 9, the first driving gear 65a and the first motor 66a are shown on an upper side of the first ring gear 64a, but actually, the first driving gear 65a and the first motor 66a are provided at positions not interfering with a visual field of an image pickup unit 19 (see FIG. 2 and FIG. 7), for instance, the first driving gears 65a and 65b are provided at sides of the first driving gears 64a and 64b.

Further, the second optical axis deflecting unit 62 is provided on a light receiving optical axis 31, and the second optical axis deflecting unit 62 comprises two second optical prisms 67a and 67b. As for the second optical prisms 67a and 67b, a Fresnel prism is preferably used respectively in order to reduce a size of an instrument.

The Fresnel prism used as the second optical prisms 67a and 67b is composed of a large number of prism elements 68 formed in parallel to each other and has a plate-like shape. Each prism element 68 has the same optical characteristics, and each prism element 68 has the same optical index and the same deflection angle as the first optical prisms 63a and 63b.

The second optical prisms 67a and 67b can be independently and individually rotated with the light receiving optical axis 31 as the center respectively. By individually controlling rotating directions, rotation amounts and rotating speeds of the second optical prisms 67a and 67b, an optical axis of a reflected distance measuring light as entered is deflected in an arbitrary direction.

Outer shapes of the second optical prisms 67a and 67b are arranged in a disk-like shape with the light receiving optical axis 31 as the center. A second ring gear 69a is fitted with an outer periphery of the second optical prism 67a, and a second ring gear 69b is fitted with an outer periphery of the second optical prism 67b.

A second driving gear 71a meshes with the second ring gear 69a, and the second driving gear 71a is fixed to an output shaft of a second motor 72a. Further, a second driving gear 71b meshes with the second ring gear 69b, and the second driving gear 71b is fixed to an output shaft of the second motor 72b.

As each of the second motors 72a and 72b, similar to the first motors 66a and 66b, a motor capable of detecting a rotation angle or a motor which rotates corresponding to a driving input value, for instance, a pulse motor is used. Alternatively, a rotation amount of the motor may be detected by using a rotation angle detector for detecting a rotation amount (rotation angle) of the motor, such as an encoder, for instance, or the like. The rotation amount of each of the second motors 72a and 72b is detected, and a synchronization control with the first motors 66a and 66b is carried out by an arithmetic processing unit 23 (see FIG. 2 and FIG. 7).

The distance measuring light as emitted from a light emitting element (see FIG. 2 and FIG. 7) is deflected in a direction as required and at an angle as required and projected by passing through the first optical prisms 63a and 63b.

Figure 2:
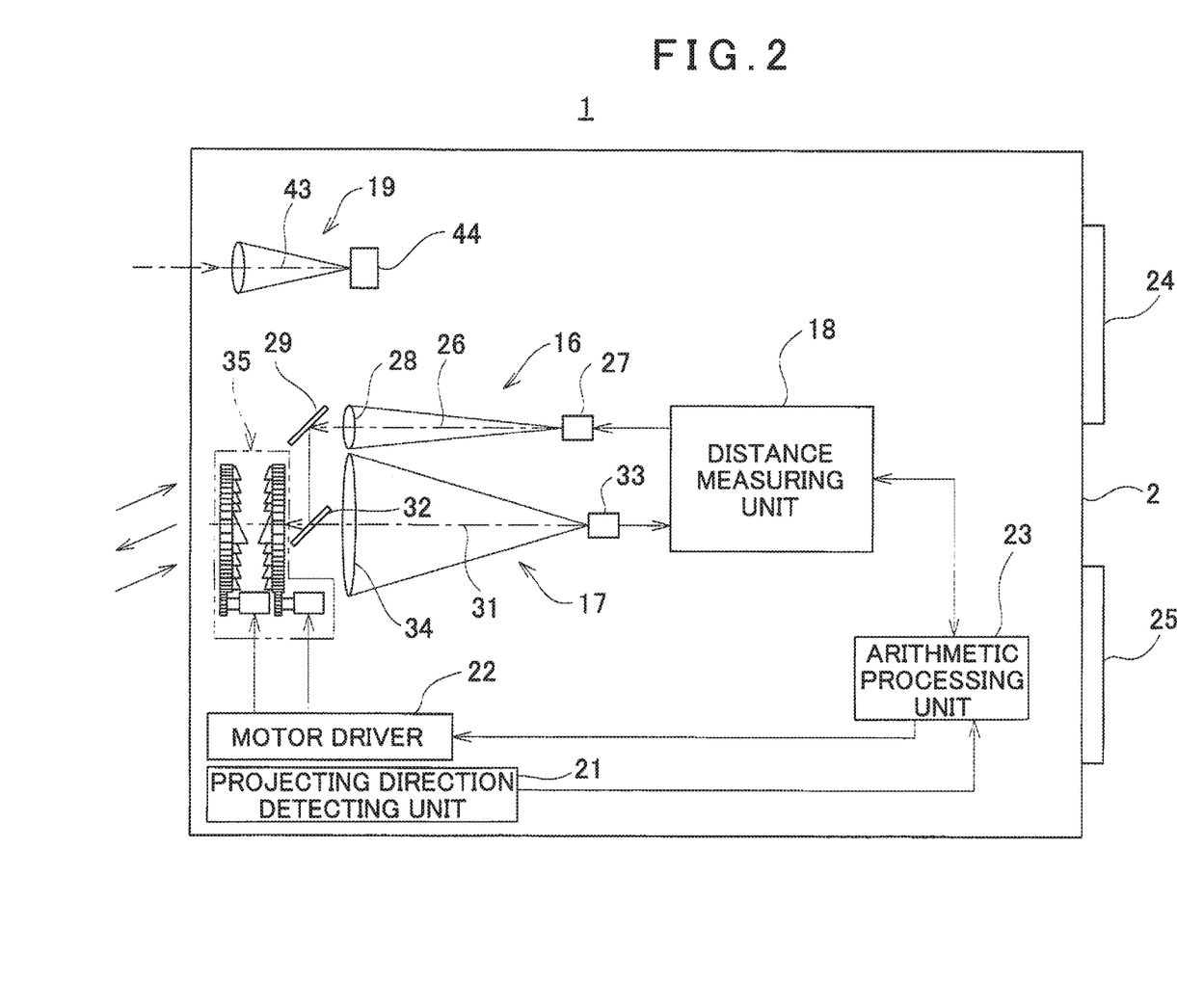
FIG. 2 is a schematical drawing to show an optical system of the measuring instrument according to the first embodiment of the present invention.

Further, the reflected distance measuring light as reflected by the object to be measured passes through the second optical prisms 67a and 67b, is deflected to become in parallel to the light receiving optical axis 31 and is received by a light receiving element 33 (see FIG. 2 and FIG. 7). Based on a light receiving result of the light receiving element 33, a distance measurement by a distance measuring unit 18 is performed.

Figure 1:
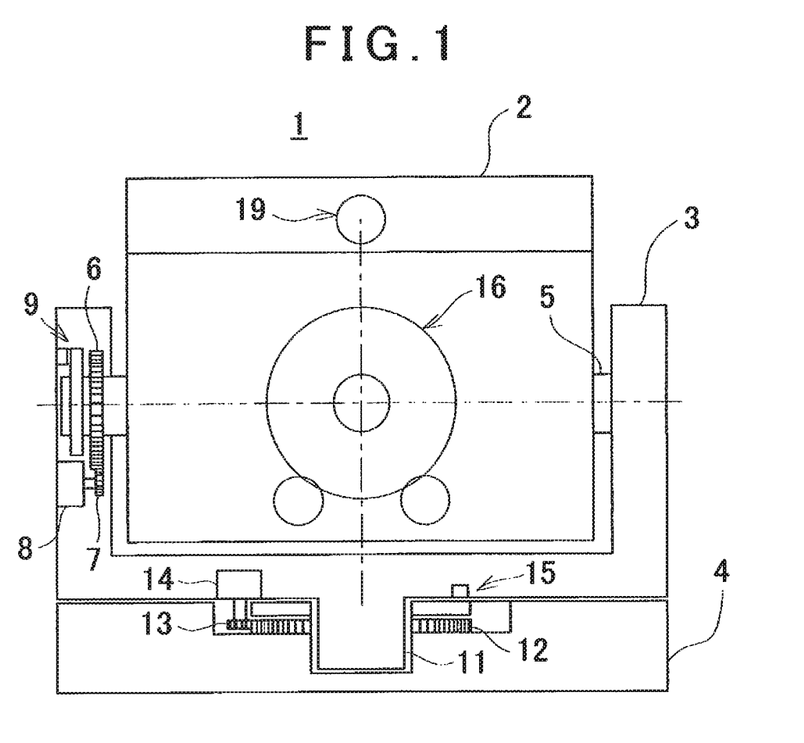
FIG. 1 is a front view of a measuring instrument according to a first embodiment of the present invention.

In a case of the variation example as described above also, since the projection optical axis 26 can be deflected to an arbitrary position by rotations of the first optical prisms 63a and 63b and the second optical prisms 67a and 67b, a measuring point can be changed without rotating a measuring instrument main body 2 with heavy-mass (see FIG. 1) and a frame unit 3 with heavy-mass (see FIG. 1). Therefore, it is possible to change the measuring point at high speed, to shorten the measurement time, and to acquire three-dimensional data of the arbitrary position by a simple arrangement.

The invention claimed is:

1. A measuring instrument comprising; a light emitting element for emitting a distance measuring light, a distance measuring light projecting unit for projecting said distance measuring light, a light receiving unit for receiving a reflected distance measuring light, a light receiving element for receiving said reflected distance measuring light and for producing a light receiving signal, a distance measuring unit for performing a distance measurement based on the light receiving signal from said light receiving element, a first optical axis deflecting unit disposed on a projection optical axis of said distance measuring light and for deflecting an optical axis of said distance measuring light at a deflection angle as required and in a direction as required, a second optical axis deflecting unit disposed on a light receiving optical axis and for deflecting said reflected distance measuring light at the same deflection angle and in the same direction as said first optical axis deflecting unit, a projecting direction detecting unit for detecting a deflection angle and a deflecting direction as performed by said first optical axis deflecting unit, an image pickup unit which has an image pickup optical axis having a known relation with said projection optical axis and for acquiring image data including an object to be measured, a display unit for displaying an image acquired by said image pickup unit, a control unit for controlling the distance measurement by said distance measuring unit and for controlling deflections of optical axes of said distance measuring light and said reflected distance measuring light, and a measuring instrument main body adapted to accommodate said light emitting element, said distance measuring light projecting unit, said light receiving unit, said light receiving element, said distance measuring unit, said first optical axis deflecting unit, said second optical axis deflecting unit, said projecting direction detecting unit, said image pickup unit, said display unit, and said control unit, to be rotatably supported in an up-and-down direction and in a left-and-right direction by a supporting unit, and to be rotated in the up-and-down direction and in the left-and-right direction by a rotation driving unit, wherein said image pickup unit is configured so as to have a field angle larger than a deflection area of said distance measuring light deflected by said first optical axis deflecting unit, and said object to be measured is designated on said image, wherein said distance measuring light is projected through said first optical axis deflecting unit, said reflected distance measuring light is received by said light receiving element through said second optical axis deflecting unit, and wherein, by designating said object to be measured on said image, said control unit controls said projection optical axis to be directed toward said object to be measured by said first optical axis deflecting unit, or said control unit controls to scan said object to be measured or a measurement target area by said distance measuring light within a range of the field angle of said image pickup unit by said first optical axis deflecting unit, and further said control unit acquires three-dimensional data of said object to be measured or said measurement target area based on a result of the distance measurement of said distance measuring unit and on a detection result of said projecting direction detecting unit and displays said three-dimensional data as acquired on said image of said display unit.

2. The measuring instrument according to claim 1, wherein said distance measuring light projecting unit has a projection optical axis deflecting unit for coinciding said projection optical axis with said light receiving optical axis, said first optical axis deflecting unit is provided at a central part of said second optical axis deflecting unit, and said distance measuring light is deflected by said projection optical axis deflecting unit and is projected through said first optical axis deflecting unit.

3. The measuring instrument according to claim 2, wherein said supporting unit has a detection unit for detecting a rotation angle in the up-and-down direction and a rotation angle in the left-and-right direction of said measuring instrument main body, and said control unit controls a driving of said rotation driving unit so as to perform the distance measurement of the measuring point out of a deflection area of said first optical axis deflecting unit based on a detection result of said detection unit.

4. The measuring instrument according to claim 3 further comprising a tracking light projecting unit for projecting a tracking light, a tracking light receiving unit for receiving a reflected tracking light, a tracking light receiving element for receiving said tracking light and for producing the light receiving signal, and a tracking unit for tracking an object to be measured based on the light receiving signal from said tracking light receiving element.

5. The measuring instrument according to claim 2, wherein said second optical axis deflecting unit is a Fresnel prism.

6. The measuring instrument according to claim 2, further comprising a tracking light projecting unit for projecting a tracking light, a tracking light receiving unit for receiving a reflected tracking light, a tracking light receiving element for receiving said tracking light and for producing the light receiving signal, and a tracking unit for tracking an object to be measured based on the light receiving signal from said tracking light receiving element.

7. The measuring instrument according to claim 1, wherein said supporting unit has a detection unit for detecting a rotation angle in the up-and-down direction and a rotation angle in the left-and-right direction of said measuring instrument main body, and said control unit controls a driving of said rotation driving unit so as to perform the distance measurement of the measuring point out of a deflection area of said first optical axis deflecting unit based on a detection result of said detection unit.

8. The measuring instrument according to claim 7 further comprising a tracking light projecting unit for projecting a tracking light, a tracking light receiving unit for receiving a reflected tracking light, a tracking light receiving element for receiving said tracking light and for producing the light receiving signal, and a tracking unit for tracking an object to be measured based on the light receiving signal from said tracking light receiving element.

9. The measuring instrument according to claim 1, wherein said first optical axis deflecting unit and said second optical axis deflecting unit comprise a pair of circular optical prisms overlapped on each other, and each of said optical prisms is independently rotatable.

10. The measuring instrument according to claim 9, wherein said second optical axis deflecting unit is a Fresnel prism.

11. The measuring instrument according to claim 1, wherein said second optical axis deflecting unit is a Fresnel prism.

12. The measuring instrument according to claim 1, further comprising a tracking light projecting unit for projecting a tracking light, a tracking light receiving unit for receiving a reflected tracking light, a tracking light receiving element for receiving said tracking light and for producing the light receiving signal, and a tracking unit for tracking an object to be measured based on the light receiving signal from said tracking light receiving element.

13. The measuring instrument according to claim 1, wherein said first optical axis deflecting unit and said second optical axis deflecting unit are unitized and are designed to be attachable and detachable from each other.

* * * * *